W. HEISTERMAN.
ADVERTISING DEVICE.
APPLICATION FILED JUNE 1, 1909.

978,157.

Patented Dec. 13, 1910.

Witnesses
L. H. Mehlhope,
W. B. Berefel

Inventor
William Heisterman
by Clarence E. Mehlhope,
his Attorney.

UNITED STATES PATENT OFFICE.

WILLIAM HEISTERMAN, OF LONDON, ENGLAND.

ADVERTISING DEVICE.

978,157.   Specification of Letters Patent.   Patented Dec. 13, 1910.

Application filed June 1, 1909. Serial No. 499,434.

*To all whom it may concern:*

Be it known that I, WILLIAM HEISTERMAN, a subject of the Kingdom of Great Britain, and resident of London, in the county of London, England, have invented a certain new and useful Improvement in Advertising Devices, of which the following is a full, clear, and exact description; reference being made to the accompanying drawings, which form a part of my specification.

My invention relates to advertising devices such as tablets, posters, show cards and the like, and its object is to produce articles of this kind which will display certain announcements, designs, devices or pictures, or a combination of any or all of them in such a manner that they will be visible by natural or artificial reflected light, but disappear by transmitted light and their places be taken by other announcements, designs, devices or pictures or a combination of any or all of them, which are only visible by the transmitted light.

In carrying out my invention, I provide a suitable paper, linen or other display surface of such a nature that without being transparent, it will permit rays of light to pass through it,—in other words the display surface is translucent. On the front, or positive, side of this display surface I paint, print or otherwise depict so much of the announcement or the like, as is to be viewed by reflected light, and on the back of the display surface I paint, print or otherwise depict a repetition of what is on the front in such manner that the matter on the front will disappear when the surface is illuminated from the back, and on the back I also depict, in a reverse or negative manner, the matter which it is desired to display in substitution for what has been rendered invisible, or more or less so, by the transmitted rays.

Figure 1:
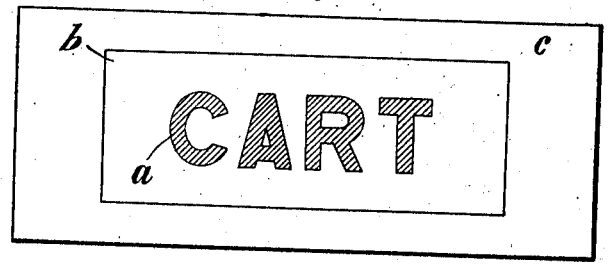
Figure 2:
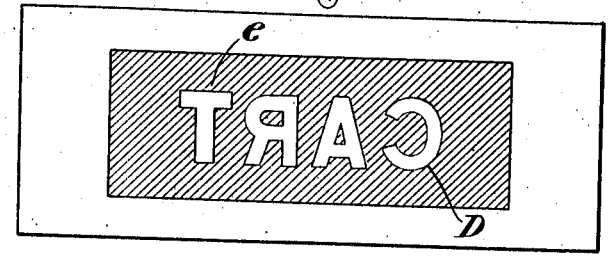
Figure 3:
Figure 4:
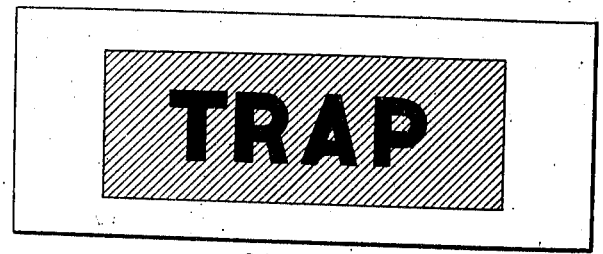

In the drawings, Figure 1 shows a portion of the front of a display surface prepared in accordance with my invention and Figs. 2 and 3 views of the same portion seen from behind and Fig. 4 a view seen from the front, when illuminated from behind.

I depict in transparent color, blue, for example, the letters "a" on a white ground, "b", on the display surface, "c", made of suitable material which will allow light to pass through it, linen or paper, for instance. The letters "a" will therefore be visible by reflected light. At the back I depict the letters uncolored on a blue ground as shown at "d" and "e", Fig. 2, the letters on the back being of course reversed, and in exact register with those on the front of the display surface. With the front and back-lettering thus depicted it will be obvious that although the letters on the front will be visible by reflected light they will disappear when seen by transmitted light owing to the blue letters in front coming directly over the uncolored ones behind, and the white ground in front coming directly over the blue ground at the back. If then, any other lettering, such as is shown for example at "f" in Fig. 3, be depicted in the reverse direction at the back of the display surface it will be invisible by reflected light and become visible by transmitted light simultaneously with the disappearance of the letters on the front, the result being as shown at Fig. 4 when illuminated from behind.

The letters, designs, pictures or devices may be in lines or dots or solid, or in combination of any or all of them, and they may be in any colors or combination of colors and certain parts may be transparent or translucent or more or less so, as may be desired.

The display surface may be framed or not, and may form the front of a chamber which contains the means for illuminating the design by transmitted light.

The invention can be used in combination with a flasher for electric light, or a mechanical device for operating the source of illumination.

Although I have given an example of how my invention can be carried into effect, nevertheless I do not confine myself to such an application, as it can be otherwise applied, as for instance in exhibiting a face of sad impression by reflected light and a smiling one by transmitted light.

Having thus described my invention what I desire to claim as new and to cover by Letters Patent is:—

An advertising device comprising a sheet of fabric which is translucent, the same having on its front side designs and the like made in colors which are transparent and on its rear side a reproduction of the designs and the like on the front side in reverse or negative manner, the designs and the like uncolored on a ground which is a reproduction of the color of the design and the like on the front side, and in addition on the rear side designs and the like in reverse or negative manner in opaque colors, substantially as and for the purpose described.

WILLIAM HEISTERMAN.

Witnesses:
   H. D. JAMESON,
   TH. RAND.